(12) United States Patent
Newman et al.

(10) Patent No.: US 7,407,001 B2
(45) Date of Patent: Aug. 5, 2008

(54) HVAC WITH DETACHED DEFLECTOR

(75) Inventors: David S. Newman, Lake Orion, MI (US); Richard E. Delplace, Livonia, MI (US); Steven B. Marshall, Oxford, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 594 days.

(21) Appl. No.: 10/954,892

(22) Filed: Sep. 30, 2004

(65) Prior Publication Data

US 2006/0065388 A1   Mar. 30, 2006

(51) Int. Cl.
*B60H 1/00* (2006.01)
*F25D 21/14* (2006.01)

(52) U.S. Cl. .................. 165/202; 165/42; 165/204; 62/285; 62/291

(58) Field of Classification Search .............. 165/42, 165/43, 44, 202, 203, 204; 62/285, 291
See application file for complete search history.

(56) References Cited

U.S. PATENT DOCUMENTS

| 5,988,263 | A  |   | 11/1999 | Schwarz |   |
| 6,007,421 | A  |   | 12/1999 | Schwarz |   |
| 6,347,988 | B1 | * | 2/2002  | Kurokawa et al. | 165/42 |
| 6,415,857 | B1 | * | 7/2002  | Nakamura et al. | 165/204 |
| 6,478,083 | B1 | * | 11/2002 | Nanba et al. | 62/291 |
| 6,959,561 | B2 | * | 11/2005 | Kawada et al. | 165/43 |
| 6,994,157 | B1 | * | 2/2006  | Arold | 165/203 |

FOREIGN PATENT DOCUMENTS

DE   3623185 A    1/1988
DE   4410120 A   12/1994

OTHER PUBLICATIONS

U.S. Appl. No. 10/729,456, filed Dec. 5, 2003, Newman et al.

* cited by examiner

*Primary Examiner*—Ljiljana (Lil) V Ciric
(74) *Attorney, Agent, or Firm*—Dierker & Associates, P.C.

(57) ABSTRACT

A structure to provide air flow an mixture in an HVAC unit utilizing a separate piece air deflector located within the lower housing of the HVAC unit and ribs to direct airflow, the separate piece air deflector configured to cause air deflection and airflow towards the distribution area of the unit.

10 Claims, 9 Drawing Sheets

HVAC WITH DETACHED DEFLECTOR

BACKGROUND OF THE INVENTION

The present invention relates to the field of directing ventilating air and airflow control in a ventilating, heating or air conditioning system. More specifically, the present invention relates to a structure and method to provide air flow diversion via a detached air deflector within the HVAC housing.

1. Field of the Invention

The present invention relates generally to airflow control in heating and air conditioning units, particularly for automotive purposes.

2. Description of the Prior Art

In automotive ventilating systems and in ventilating systems in general, air needs to be directed within the HVAC unit to provide for the correct air volumes and temperatures to desired areas prior to its flow through respective air passageways. The air can be directed via outlet means such as doors, and, specifically, blend doors, so the air proceeds to the desired area under selected design conditions. For example, a design may provide for heated or cooled air so that air flows past, through, over, or by an evaporator and/or a heater core prior to reaching a distribution area or zone at a certain temperature, and finally being distributed to the appropriate areas of the cockpit, passenger compartment or other area of the vehicle.

Ventilating, heating and air conditioning systems in modern vehicles strive to provide a total interior climate control. Such systems maintain a desired temperature by delivering an appropriate mix of ambient, cooled and heated air to the vehicle interior. Such systems conventionally include an air duct, which is selectively connected to the external air or to the interior of the vehicle cabin, a fan for causing the air to flow, and an evaporator unit and a heater unit within the respective ducts for cooling or heat the air. The cold air output from the evaporator unit may be supplied directly to various outlets within the vehicle cabin or some of the cold air may be passed through a heating heat exchanger (heater core) whose heated air output is mixed with the cold air to provide temperature control of the air output to the cabin. Diversion of the cold and/or hot air through the HVAC unit can be controlled by a series of so-called "blend doors".

In the invention of U.S. Pat. No. 5,988,263, issued Nov. 23, 1999, Schwarz, an air flow mixer structure for a vehicle air conditioning system having a first conduit for a first air flow, a second conduit for a second air flow, an opening between said first and second conduits for merging said first and second air flows in a merging region and a common air channel for said merged air flows wherein the mixer structure is disposed in the first conduit for controlling the first air flow, the mixer structure having an air inlet region and an air outlet region opening into said merging region, the mixer structure comprising plural air passages disposed between said inlet region and said outlet region for dividing an air flow at said inlet region into plural air flows at plural said openings into said merging region is described.

In the past, many HVAC systems have been devised wherein multiple blend doors as well as mode doors, were needed to ensure that heated and/or cooled air to different areas of the passenger compartment of the vehicle. Either HVAC systems could have one or two piece molded housings with features for diverting air molded into or as part of the walls of the housing, or multiple doors and levers and links to control the blending functions. A large housing space was thus needed in such systems.

In the prior art, a number of designs are known, with or without deflectors molded into the housing. In order to mold a deflector directly into the housing, however, a much greater space is required within the vehicle itself in order to carry the HVAC. Where space constraints exist, there is a need to provide for a moldable housing with features of a larger unit, for example there is still a need for some sort of air diverting or deflecting device, but one that can function in a smaller packaging area for the overall HVAC housing. The present invention, by providing for a separate, and, preferably, individually molded deflector piece or part that can be subsequently located or placed within the HVAC housing instead of being molded therewith, provides for a highly functioning air conditioning system that fits in a relatively smaller space than that of the prior art.

OBJECTS OF THE INVENTION

In view of the drawbacks and disadvantages identified in the prior art, it is an object of the present invention to provide a simpler and more reliable mechanism for both mixing and controlling air in HVAC unit. It is an object of the present invention, particularly in its preferred embodiments, to solve the problem caused by space or packaging constraints for a HVAC units, such as the need for a number of doors, and the need for a diversion of air and drainage of water from an HVAC unit. By providing an HVAC system with an HVAC unit having a separate piece deflector, and reduction to, preferably, a single blend door, (or, more preferably, a blend barrel door), prior to mixing or distribution of air in the unit, the present invention decreases the number of separate elements necessary to provide appropriate mixing of air, as well as simplifying, reducing the space requirements of, and potentially reducing the overall cost of the system, while effectively minimizing the effects of 'spitting' or projection of water over to the heater core from the evaporator, and drainage of any undesired water from both sides of the deflector.

SUMMARY OF THE INVENTION

The present invention meets the above needs by providing an air distribution module for a vehicle heating, ventilation and air conditioning system wherein said module mixes air streams in a small HVAC unit space, as well as directs the air in the HVAC unit for automotive use. The air distribution module preferably further comprises at least one heat exchanger, more preferably at least one evaporator means, and, preferably, a heater means, even more preferably an evaporator and a heater core or the like. In general, the air distribution module for a vehicle heating, ventilation and air conditioning system in accordance with the present invention comprises an HVAC housing; a heater means; an evaporator means; and at least one deflector means separate from the HVAC housing. By deflector means and separate piece deflector means is meant a deflector means that is not integrally molded to or molded with the housing of the HVAC unit, but that is provided as a separate piece separately molded or otherwise produced and positioned or located within the HVAC housing independently or in a separate step. Preferred embodiments of the present invention further comprise at least one door for mixing air, and, preferably, a blend door; a separate air deflector; and at least one rib or ribs on the interior of the housing. More preferably, the housing is and at least two portion housing, the heater means is a heater core, the evaporator means is an evaporator core, the door is a blend barrel door placed downstream of the heater core and the evaporator is core, and the deflector means has a drainage means located as close to the floor or base of the housing as possible, to provide for drainage of water or condensate from the HVAC unit.

The present invention can be used in systems having less housing space, since diverting features are not part of, but a separate piece from, the molded housing of the prior art. By locating the deflector means inside the HVAC housing after molding, the deflector means, and, in particular, a separate 'molded' deflector means, with preferably, two faces or sides and two drainage means incorporated one on either face or side of the deflector means, provides both an air deflector or air diversion and water channeling function, while reducing the numbers of parts normally required to perform all these functions. More specifically, by locating the deflector means as a separate piece after molding of the HVAC housing, it reduces packaging space requirements, and provides for locating or placing of the deflector means while allowing the deflector means to drain moisture removed or separated from air from the evaporator side or the heater core side of the deflector. Use of such a separate piece deflector means has the advantages of providing for an easily manufacturable part, allowing for reduction in the numbers of doors in the HVAC unit, and providing drainage for the HVAC unit. In preferred embodiments of the present invention, the elimination of blend door between the evaporator and heater core, and use of only one blend barrel door at the area of the distribution area, eliminates the need for the levers and links to control the blending function.

In the embodiments of the present invention, a deflector means formed separately from the housing itself is located within the housing of the HVAC unit, in a position between the evaporator and the heater core of the module. Preferably, the housing and the deflector means are both made of plastic or resin or plastic or resin like materials, capable of being molded. Preferable, the housing or the deflector means are molded. More preferably the housing and the deflector means are molded. In preferred embodiments of the present invention, the placement of the deflector means between the evaporator and the heater core eliminates the need for additional doors, such as blend doors, between the evaporator and the heat exchanger in the area upstream of the distribution area. In preferred embodiments of the present invention, the deflector means is located upstream of the distribution area. Also, in preferred embodiments, a blend door, and, in particular, a barrel shaped or 'blend barrel door' is provided, that is positioned between the heater core and the evaporator, downstream of the deflector means. Most preferably, the door is placed downstream of the evaporator and the heater core, and upstream of the distribution area. Most preferably one door is placed at the junction of the evaporator and the heater core so that the one door which is located downstream of the evaporator and the heater core, and upstream of the distribution area, operates such that in one extreme position air in an air stream that has passed by or through only the evaporator (the cold air) flows or flow into the distribution area, and, in the opposite extreme position, causes none or almost none of the air in an air stream that has passed by or through the evaporator, flows to the distribution area. Likewise, the positioning of the door leads to the same effect on air that has passed through or by the heater core (in one extreme position, air in an air stream that has passed by or through the heater core (the heated air) flows through into the distribution area, and, in the opposite extreme position causes none or almost none of the air in an air stream that has passed by or through the heat exchanger, flows to the distribution area. In intermediate positions, different proportions of cold air and heated air can be provided.

In a preferred mode of operation, the blend door, and, preferably the blend barrel door, would be located downstream of the heater core and evaporator and would move between air passages for heated air from the heater core (or air directly downstream from the heater core (warm air)) and cold air from the evaporator. The axis of the door would be downstream of the passages that are closed off by the door.

The housing of the HVAC unit, in preferred embodiments of the present invention, is formed in two or three pieces. In preferred embodiments, the HVAC, when assembled, has, at the minimum, an area for the blower or air propulsion means (blower portion) having a post propulsion device or blower air outlet, and an area wherein the heat exchanger (cooling and/or heating elements) are provided ('lower portion'). Another portion can optionally defined as the 'upper portion' wherein the air, which is of the temperature and/or volume desired, passes or stays (upper portion inner walls forming a distribution area), prior to distribution to the outlets or ducts of the ventilation system.

In preferred embodiments of the present invention, the lower portion of the housing comprises areas internal to the housing where the flow of air is present. In the present invention, use of separate piece deflector means in lieu of various blend doors between the evaporator means and heater means, can lead, in some designs, to increased heat pick up or secondary or back circulation or flow, from heated and/or to warm to cold areas or zones in the HVAC unit. As described above, the air or air flow can be defined as cold or heated, depending on whether or not the air has passed by or through a specific type of heat exchanger. In more preferred embodiments of the present invention, internal areas or walls of the housing define a 'heated zone' where is found heated air or air flow, a cold zone wherein is found cold air or air flow from the evaporator means and a 'warm zone' wherein is found air between the deflector means and the heater means. The heated zone, and, preferentially, the heated zone and warm zones, have a projection or rib or projections or 'ribs' on or projecting from the inner wall of the housing. More preferably, the projection(s) or ribs are molded in the housing wall in the area of the heated zone. The ribs serve the purpose of ensuring that the heated air is directed downstream and towards the blend door, and so that significant 'recirculation' or 'redirection' of heated air backward through or by the heater core into the cold area on the interior of the lower housing, does not occur, i.e. to prevent heat pick up in the warm and/or cold zones. The rib or ribs in the heated zone are downstream of a heater means. In preferred embodiments, the rib or ribs are aligned with normal air flow in the heated zone area. By providing for these projection(s) or rib(s), the appropriate temperature of heated air reaching the blend door is maintained, and thereby, the appropriate temperature of air is established in the distribution area after passage of the air from the heated and/or cold areas of the lower housing.

In preferred embodiments of the present invention, the deflector means is contoured or shaped to allow cold air to be diverted or deflected from an area, the so-called 'cold area' of the lower housing upstream of the deflector and downstream the evaporator. The deflector means is preferably a separate piece or part molded out of plastic or resin or a plastic or resin like material, that is folded or bent or molded into a configuration to present at least two discrete contoured faces. More preferably, the deflector with at least two faces has, when correctly positioned in the lower housing of the HVAC unit, one face facing the evaporator and one face facing the heater core. More preferred is a deflector means with at least one basically smooth contour. Even more preferred, the basically smooth contour is on the side of the deflector means facing the evaporator. Even more preferred is a deflector whose at least one contoured face allows for the maximum or air to flow from the cold area towards the distribution area. Also more preferred is a deflector means that has at least one contoured face, wherein the contoured face diverts air towards the distribution area, while allowing any condensate or water resulting from passage of air by or through the evaporator, to be drained towards the bottom or the draining means of the lower housing of the HVAC unit. As described above, in preferred embodiments of the present invention, the deflector of the present invention, in addition to the faces, also has extensions or arms for keeping the deflector means above the base or area of eventual drainage of water from the HVAC unit, or the floor HVAC housing. The arms of the deflector means also provide, in preferred embodiments, an area of placement and support for the heat exchanger, and, especially evaporator, away from the base or floor of the HVAC unit.

The deflector means with at least one contoured face preferably does not interfere with the air or air flow, but deflects, directs or diverts air, as appropriate, towards the cold, heated or warm zones and eventually, distribution areas. To prevent undue interference, (i.e. inadequate or inappropriate levels of air from reaching the distribution area), the deflector means is generally positioned in such a way that any air that passes over or is diverted by it, i.e. is not hindered to an inappropriate degree in such passage. In preferred embodiments of the present invention, the height of the deflector means, measured from the lowest point of the deflector to the point of inflection of the deflector in the case of a bended, folded, or molded one piece deflector, is less than, ½ of the height of the evaporator or ⅓ the height of the lower housing and less than ½ the height of the heating means such as the heater core.

Figure 9:
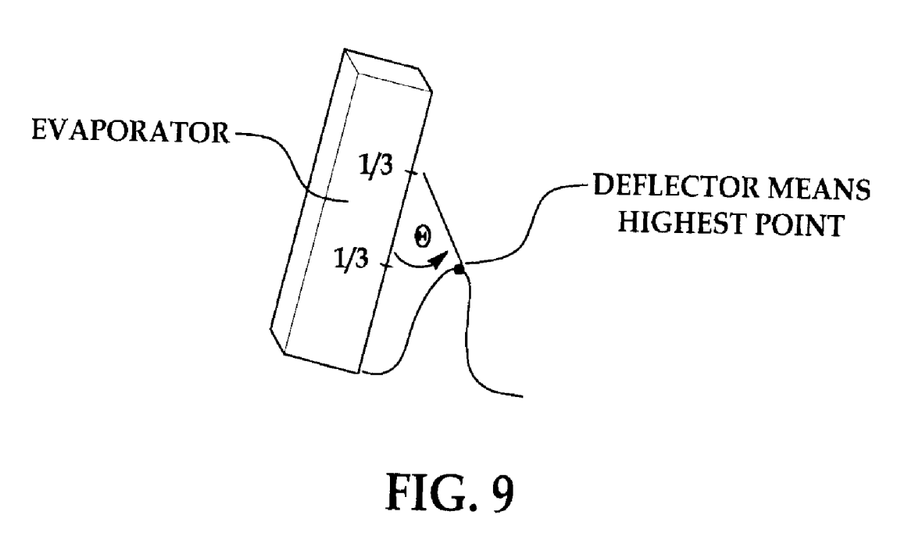
FIG. 9 shows an examplary evaporator and deflector means.

The actual height and width of the deflection means may vary—however, when positioned, the deflector at its highest point faces the evaporator at no greater than ½ of the evaporator height and at an angle of 17% relative to the upper third of evaporator and the highest point of the deflector means. For example, an illustrative evaporator and deflector means θ=17° are shown in FIG. 9.

In more preferred embodiments of the present invention, an air deflector is placed at a position such that it faces both the evaporator and the heater core. Since air that passes by or through the evaporator is often filled with moisture or 'water', especially from the evaporator surfaces, the air, as it passes through the lower housing, and, in particular, after passing by or through the evaporator, loses moisture or water which must be drained from the HVAC unit in order for the air conditioning system to function more efficiently. In preferred embodiments of the present invention, having a deflector means, the separate piece air deflector must, therefore, have a means to rest stable in the lower housing in a position inferior, below or, as determined by gravity, under both the evaporator and the heater core, as well as having a means for allowing moisture or water from the cooled air to drain out of the HVAC unit.

The present invention, in its more preferred embodiments, provides for a deflector means which further comprises a drainage means. By drainage means it is meant a way to allow moisture or water having been separated or removed from air to pass by or through the deflector means. The drainage means may be in a variety of different forms, and be formed as a number of structural features, such as, for example, at least one hole or holes, cut-outs, slots, tubes and the like whereby water from one side of the deflector means can pass to the side of the deflector means towards the outside of the HVAC unit and, eventually, to the area of eventual final drainage of the water from the HVAC housing unit.

Preferably the at least one hole or holes, cut-outs, slots, tubes, slits and the like, are located on at least one edge, bottom or side of the deflector means, more preferably, on or on the edge of at least one 'arm' or extension of the deflector means, more preferably on two arms of the deflectors means, most preferably at the bottom or lowest parts of the deflector means or the area near the air deflector and arm regions of the deflectors means, in order to provide for the maximum of drainage. In the present invention, drainage is provided on the side of the deflector means facing the evaporator (upstream side) and, preferably, on the upstream side 'arm' of the deflector means, to ensure that water and moisture in the cold area is drained from the lower housing of the HVAC unit. It has been found that holes, cut-outs, slots, slits, tubes and the like, are also preferentially found on the side or face of the deflector means in the downstream (heater core) side, and , more preferably in the 'arm' of the deflector means of the lower housing of the HVAC unit, and, preferably on the downstream side air of the deflector means, due to the potential of moisture and/or water also being found on the downstream side of the deflector in the lower housing of the HVAC unit. By providing for a deflector means with drainage means on both arms or sides of the deflector means, even water or moisture that 'spits' or comes in larger quantities than anticipated, and that may shoot or be pushed from the upstream cold area to the downstream area on the opposite side of the deflector near the heater core, (warm zone or area) may be drained.

In preferred embodiments of the present invention, the deflector means and/or the lower housing are provided with a locating means. The locating means allows the separate piece deflector means to rest more stable in the lower housing of the HVAC unit, and, reduce vibration of the deflector means. In more preferred embodiments of the present invention, the locating means consists of a rib or other raised section of the deflector or the housing wall and complementary slot or depression in the deflector or the housing wall, so that the deflector may be 'guided' and 'placed' in the appropriate position within the lower housing. By using a locating means, with a rib and slot or other comparable structures, the deflector is correctly placed with the housing and movement, such as vibrational or other movement of the deflector, in the housing can be minimized, while maintaining the deflector means in its optimal position. More preferably, the rib is located on the wall and the slot or other guide is located on the deflectors means.

As described above, the deflector means of preferred embodiments of the present invention also preferably comprises one or more extensions or arms. In more preferred embodiments of the present invention, at least one arm extends towards the evaporator containing lower part of the housing. The at least one arm rests of the floor of the lower part of the housing, and, preferably touches the floor, so that the deflector means rests upon the housing. In more preferred embodiments, the at least one arm has at least one rib or elevated support means on the side facing the evaporator when the deflector means is placed in the housing. In other more preferred embodiments, the internal wall of the housing, in the area of the lower part of the housing wherein upon the evaporator sits, also has support features that may comprise at least one rib or elevational support means. The housing has, preferably a plurality of support features, such that the evaporator and/or arms of the deflector means can rest upon the features when it is correctly positioned in the lower housing. The arm, thereby, allows the evaporator to rest slightly above it, as well as to maintain the deflector means in correct position due to the weight of the evaporator, with a minimum of vibration in the area of the deflector means.

As mentioned above, the interior wall of the present invention may, preferably, contain projections or ribs in the heated area of the lower housing upstream of the heater core. In other preferred embodiments, projections or ribs may be found in other areas of the lowering housing of the HVAC unit, e.g. on the walls of the housing upstream of the heater core and downstream of the deflector. In other more preferred embodiments, an additional rib or ribs is provided in the warm zone that helps prevent heat-pickup secondary or back circulation or flow particularly from the warm zone to the cold zone downstream of the warm zone. Occasionally, though, undesired, 'spitting' or the propulsion of water drops from the evaporator towards the warm zone downstream of the deflector may occur under some conditions. Since 'spitting' leads to water potentially being found in the warm zone downstream of the deflector, and, if any secondary, or back circulation or flow occurs from the warm zone towards the cold zone, water-filled air may eventually find its way from the warm zone to the cold zone and to the eventual distribution area. Provision of a rib or ribs, and, particularly, a rib or ribs oriented so to be potentially out of line with any secondary or back circulation or flow, so that, in the warm zone, reduces heat pickup and flow of water-filled air from near the heat core to areas downstream. By providing ribs or projections on the walls as described above, air volume and/or condensation areas can be provided that additionally channel air and/or water or vapor to the respective distribution or drainage areas respectively.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
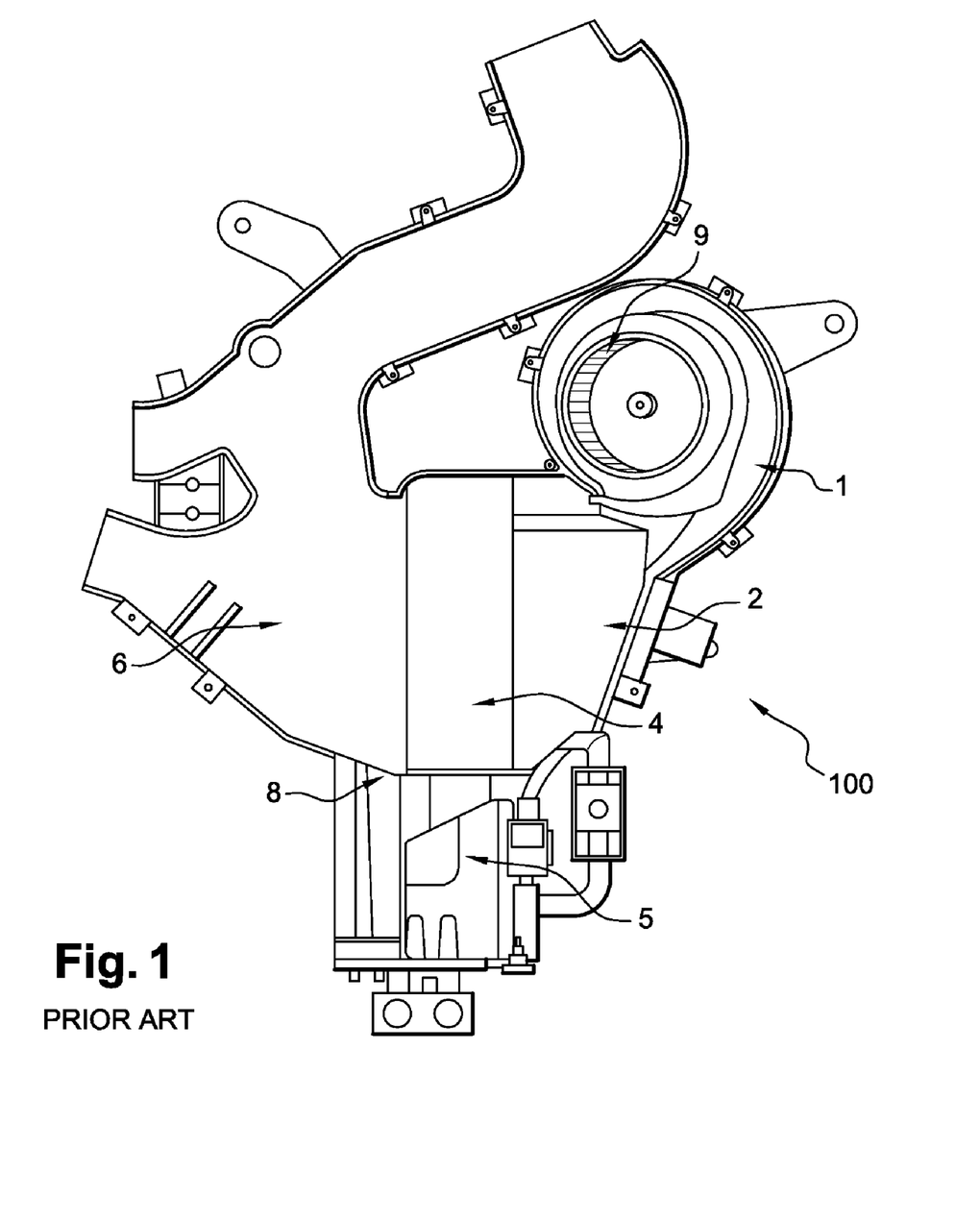
FIG. 1 is an elevational cross sectional view of an exemplary prior art HVAC unit.

A prior art HVAC system is shown in FIG. 1. The HVAC system or assembly (100) core has upper (2) and lower (8) housings. Ambient outside air or recirculated interior air is directed through air-conditioning evaporator (4) by the HVAC blower (9) in air blower scroll housing (1). After the air exits from evaporator (4), part of the air is directed through lower housing (8) and heater core (6)

Figure 2:
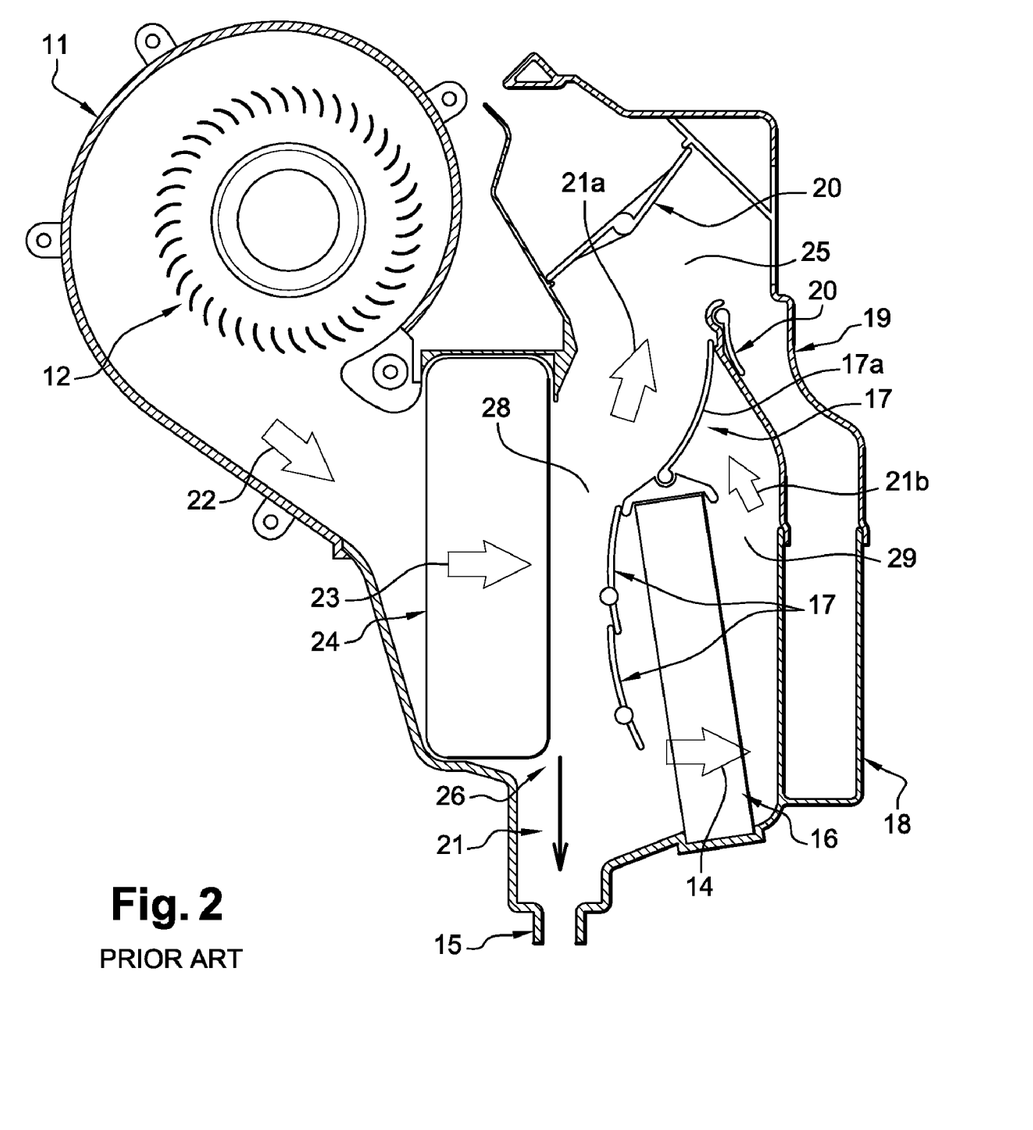
FIG. 2 is an elevational cross sectional view of another exemplary prior art unit.

In prior art drawing FIG. 2, air from blower wheel (12) creates an air path (22) directed towards the evaporator (24). Cold air is found in cold air path (23), and the cooling of air allows condensate to form which follows condensate path (26) to drain tube (15). Blend doors (17) direct air and allow various amounts of air to enter into hot air path (14) through heater core (16). Cold air follows path (21a) to distribution area (25), and heated air follows path (21b) to distribution area (25), after passing through additional blend door (17a). Air can be distributed (25) to outlets (not illustrated) such as panel, defrost and floor areas via mode doors (20). Cold zone (28) and heated zone (29) are shown.

Figure 3:
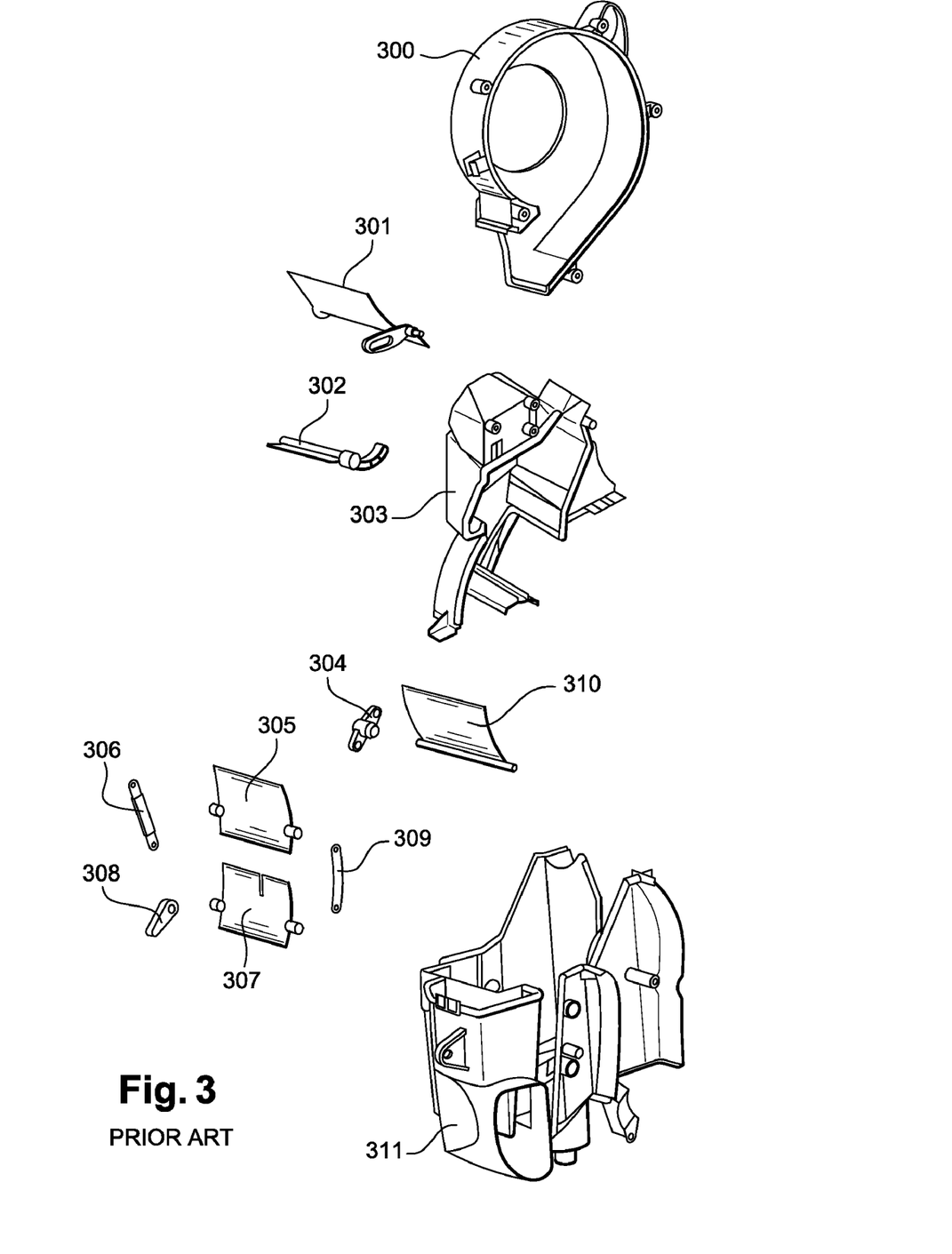
FIG. 3 is an elevational schematic view of the numerous links and levers necessary for functions of FIG. 1 and 2 of the prior art.

Referring to FIG. 3, there is illustrated a perspective view of a prior art HVAC unit. The housing (303) including lower housing (311), have multiple doors (305,307,310) and levers (304,308) and links (306,309), in addition to distribution doors (301,302).

Figure 4:
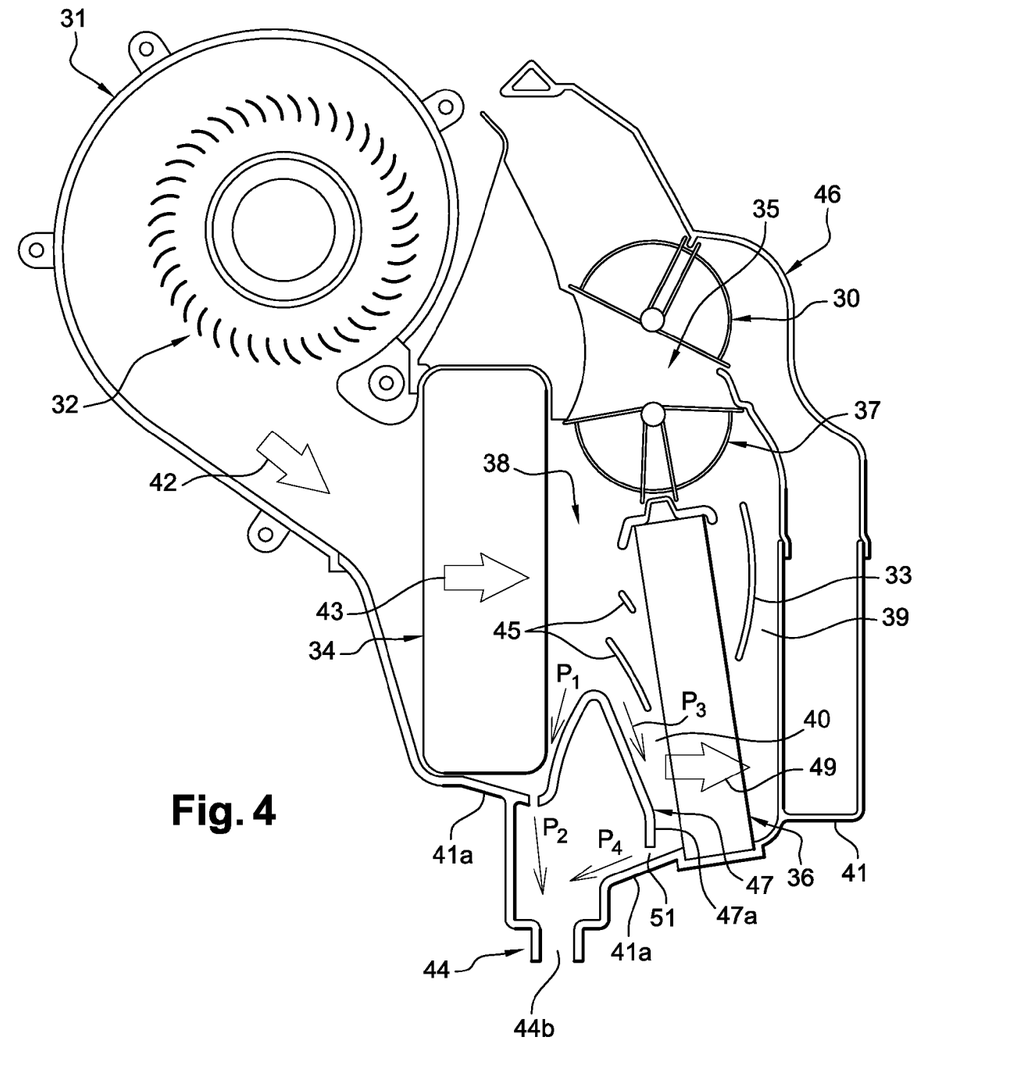
FIG. 4 is an elevational cross sectional view of an exemplary HVAC in accordance with an aspect of the present invention.

Referring to FIG. 4, there is illustrated an HVAC system wherein a blower motor scroll housing (31) with blower wheel (32) produce an air path or air flow (42) which passes through evaporator (34) to become a cold air path (43) going into cold zone (38). Ribs (45) are located in housing in the area of the cold zone. Deflector means (47) is placed as a separate part into the lower housing (41) of the HVAC unit. Base or floor (41a) of lower housing are also illustrated. Four arrows around the deflector means represent condensate paths (P1, P2, P3, P4) leading condensate to drainage area (44b) and drain tube (44). A heater means (36) is found downstream of evaporator (34) and deflector means (47). Arm (47a) has drainage means (51) illustrated. Warm zone (40) is found between deflector means (47) and heater means (36). Hot air path (49) leads heated air to enter heated zone (39) where is found rib (33) in the housing in the area of the heated zone (39). Downstream of heater means (36) and evaporator means (34) is found blend barrel door (37) (shown in its two positions) upstream of air temp mixing area (distribution area (35)). Upper portion of housing (46) forms part of the distribution area (35). Mode door (30) is shown in its two positions downstream from distribution area (35).

Figure 5:
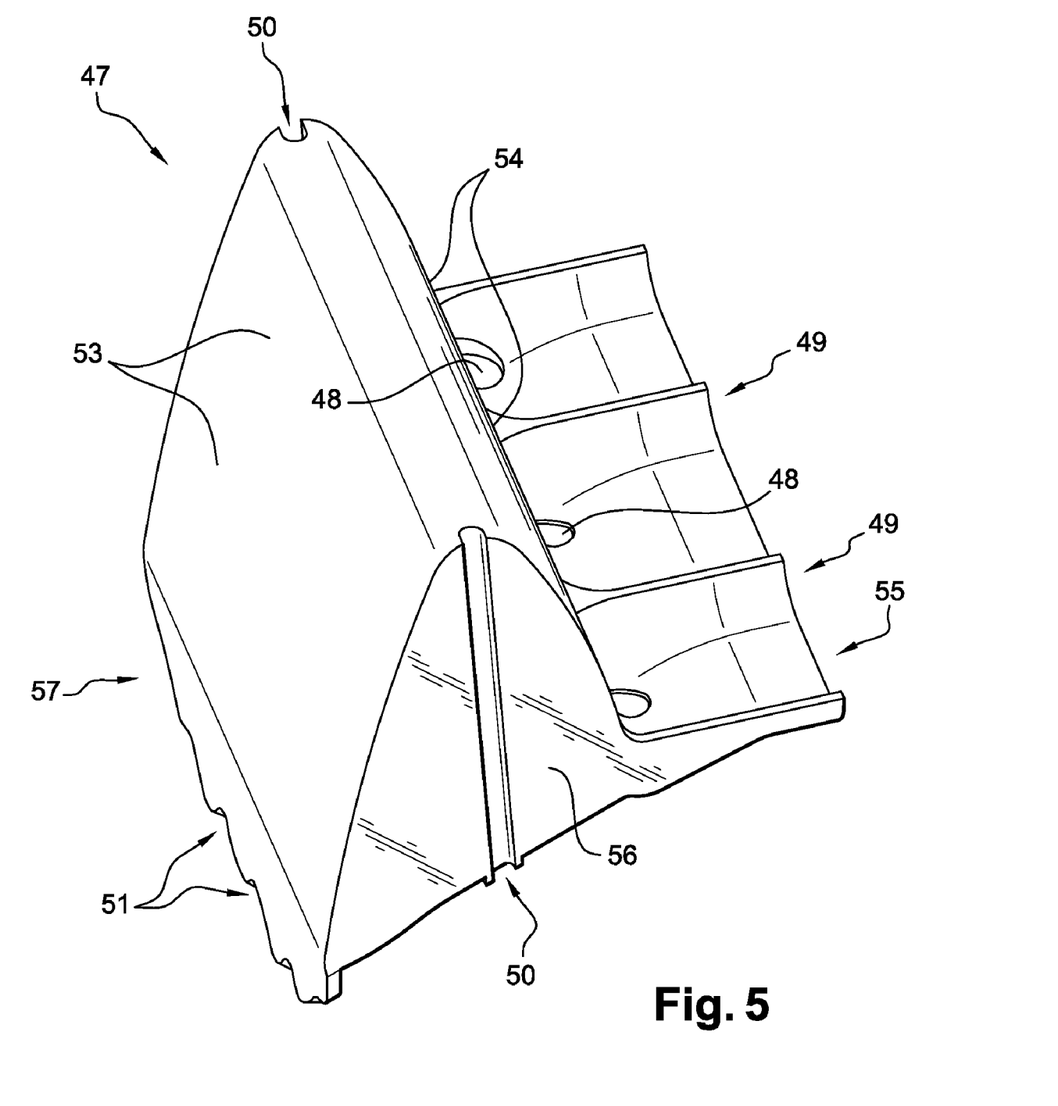
FIG. 5 is a perspective view of a deflector means for use in an HVAC unit, in accordance with an aspect of the present invention.

In FIG. 5 there is illustrated a deflector means, and, in particular, a separately molded deflector (47). The deflector (47) has face (53) which faces the heater core and face (54) that faces the evaporator. An arm (55) extends from the body (56) of the defector (47) on the side of the deflector facing the evaporator. The arm (55) further comprises drainage means (48) which allows condensate to pass to the housing area and drain tube (44) as seen in FIG. 4. Support features in the form of ribs (49) are shown on which the evaporator can rest. Locating or guide slot (50) are provided as part of locating means to accept the complementary rib (61) seen in FIG. 6 or raised section of the housing. Optional arm (57) has contours forming a drainage means (51) for condensate on the heater core side of the deflector (47).

Figure 6:
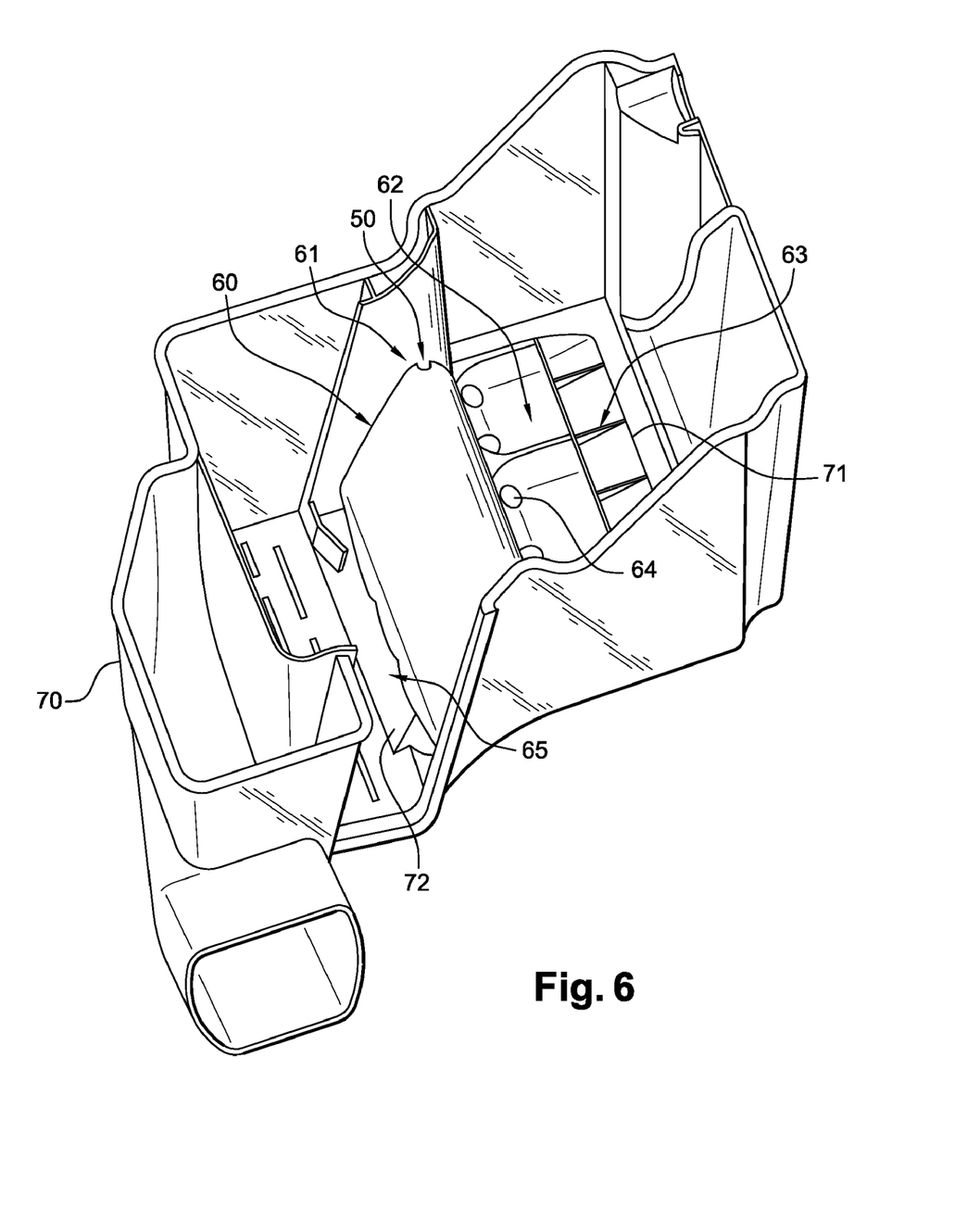
FIG. 6 is a perspective view of a deflector means in housing of an HVAC unit, in accordance with an aspect of the present invention.

Referring to FIG. 6 is illustrated an HVAC housing (70) with deflector means (60) having locating slot (50) and rib (61) as locating means. The deflector (60) has arm (71) on the evaporator side of the deflector and arm (72) on heater core side of the deflector, forming an alternate drain path (65). Arm (71) has ribs (62) and additional support ribs on the housing (63) as support feature and drainage means (64). Housing (70) has support ribs (63) for evaporator (not shown).

Figure 7:
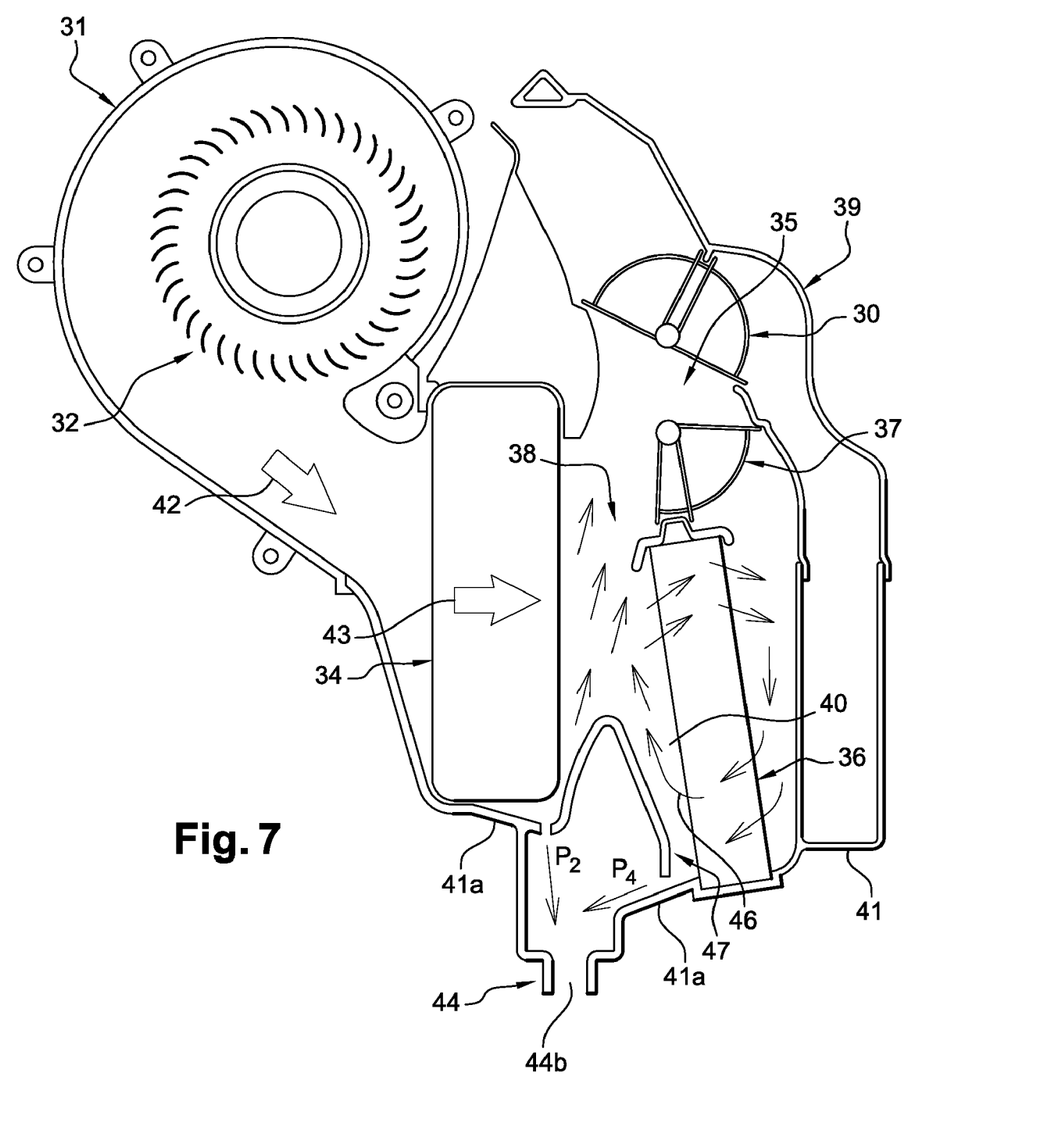
FIG. 7 is an elevational cross sectional view of an exemplary HVAC in accordance with an aspect of the present invention, with air flows illustrated.

Referring to FIG. 7, there is illustrated an HVAC system wherein a blower motor scroll housing (31) with blower wheel (32) produce an air path or air flow (42) which passes through evaporator (34) to become a cold air path (43) going into cold zone (38). Deflector means (47) is placed as a separate part into the lower housing (41) of the HVAC unit. Two arrows under the deflector means represent condensate paths (P2, P4) leading condensate to drain tube (44). A heater means (36) is found downstream of evaporator (34) and deflector means (47). Warm zone (40) is found between deflector means (47) and heater means (36) and some backflow (46) from the heater means is shown leading to the cold zone. Downstream of heater means (36) and evaporator means (34) is found blend barrel door (37) shown in full cold position upstream of air temp mixing area (distribution area (35)).

Figure 8:
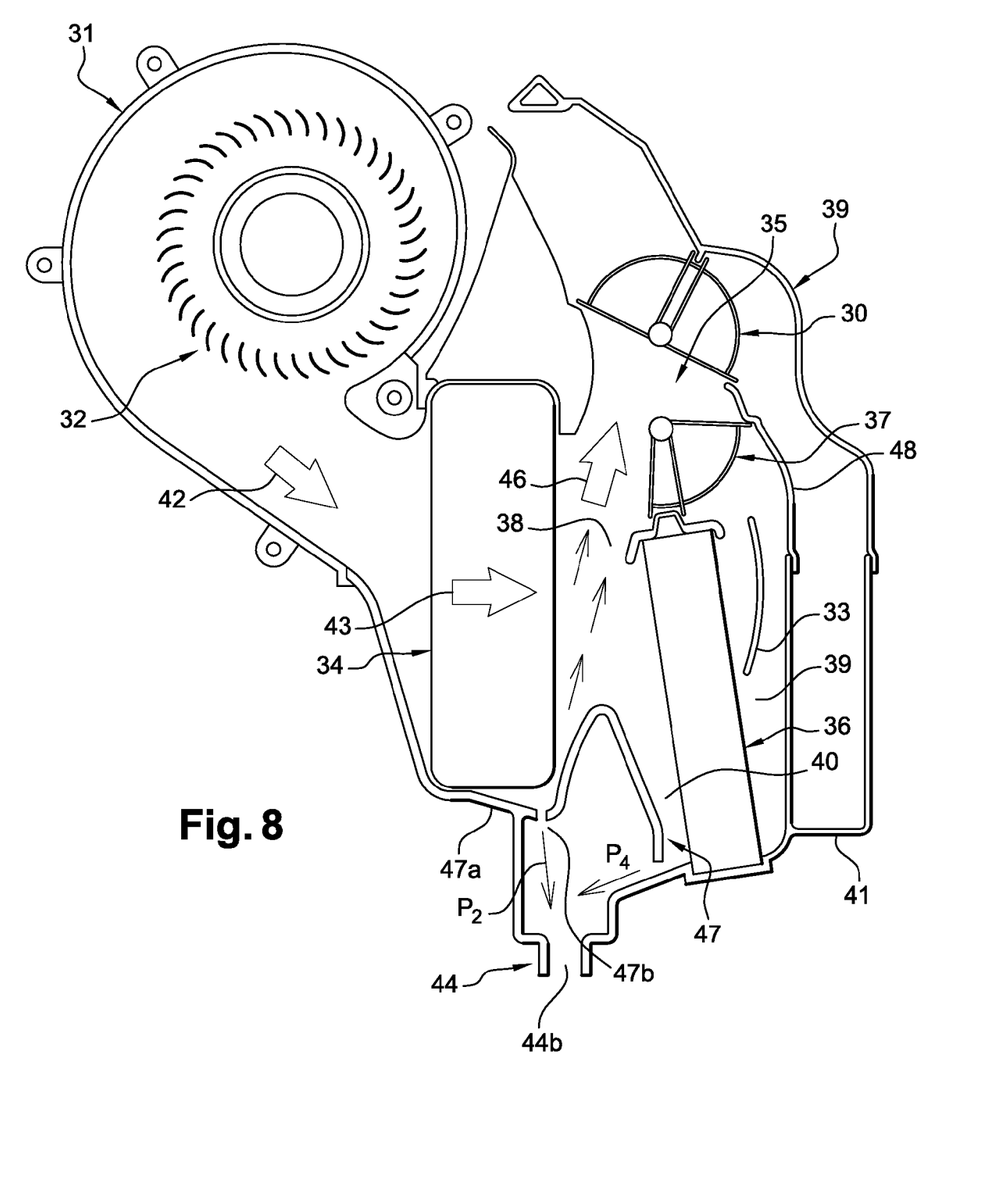
FIG. 8 is an elevational cross sectional view of an exemplary HVAC in accordance with an aspect of the present invention, with air flows and ribs directing air flows illustrated.

Referring to FIG. 8, there is illustrated an HVAC system wherein a blower motor scroll housing (31) with blower wheel (32) produce an air path or air flow (42) which passes through evaporator (34) to become a cold air path (43) going into cold zone (38). Deflector means (47) is placed as a separate part into the lower housing (41) of the HVAC unit. Two arrows under the deflector means represent condensate paths (P2, P4) leading condensate to drain tube (44). A heater means (36) is found downstream of evaporator (34) and deflector means (47). Warm zone (40) is found between deflector means (47) and heater means (36). Deflector means arm (47a) with drainage means (47b) is located under evaporator means (34). Drainage area (44b) is inferior to deflector means (47). Rib (33) is oriented in housing (48) of the HVAC unit, and prevents circulation of some of the air from the heated zone back through heater means (36) and directs heated air towards the blend barrel door (37). Cold air path (46) leads cold air to enter distribution area (35). Downstream of heater means (36) and evaporator means (34) is found blend barrel door (37) shown in full cold position upstream of air temp mixing area (distribution area (35)).

The preferred embodiment of the present invention has been disclosed. A person of ordinary skill in the art would realize, however, that certain modifications would come within the teachings of this invention. Therefore, the following claims should be studied to determine the true scope and content of the invention.

What is claimed is:

1. An air distribution module for a heating, ventilation and air conditioning system having an HVAC unit, comprising:
    an HVAC housing having an upper part and a lower part;
    a heater;
    an evaporator;
    a cold zone downstream from the evaporator;
    a heated zone downstream from the heater;
    a distribution area receiving air flow from both the cold zone and the heated zone;
    at least one separate piece deflector;
    a drainage area disposed below to the deflector a draining means for passing condensate to the drainage area;
    wherein the deflector includes the draining means and is located within the lower part of the housing close to the floor or base of the housing, so that water or condensate may be removed by the draining means to the drainage area disposed below the deflector for subsequent exit outside of the HVAC unit;
    and wherein the deflector is configured by folding, bending or molding to comprise at least two discrete contoured faces, one face facing the evaporator and another face facing the heater, with at least one of the contoured faces configured to cause a maximum of air to flow from the cold area towards the distribution area at least in some modes of operation.

2. An air distribution module according to claim 1 wherein the lower part of the housing has a rib or ribs.

3. An air distribution module according to claim 2 wherein the rib or ribs in the lower part of the housing are found in a warm zone downstream from the deflector.

4. An air distribution module according to claim 2 wherein the rib or ribs is located on the internal inner wall of the housing.

5. An air distribution module according to claim 4 further comprising a locating means.

6. An air distribution module for a vehicle heating, ventilation and air conditioning system having an HVAC unit with blower portion having an air propulsion device or blower and post propulsion device, or blower air outlet and air distribution area, wherein air flows from upstream at the air outlet area downstream to the air distribution area, comprising:
    a housing;
    an evaporator;
    a heater downstream from the evaporator;
    a cold zone downstream from the evaporator;
    a heated zone downstream from the heater;
    a distribution area receiving air flow from both the cold zone and the heated zone;
    at least one separate piece deflector downstream from the evaporator and upstream from the heater;
    a warm zone downstream from the deflector;
    a drainage area disposed below the deflector a draining means for passing condensate to the drainage area;
    a blend barrel door downstream from the evaporator, the deflector and the heater;
    wherein the blend barrel door directs air from the heated zone and the cold zone, as appropriate, to the air distribution area, to provide reduced moisture air in the air mix necessary to obtain the desired air temperature and moisture characteristics of the conditioned air prior to distribution outside of the HVAC unit;
    wherein the deflector includes the draining means and is located within the lower part of the housing close to the floor or base of the housing, so that water or condensate may be removed by the draining means to the draining area disposed below the deflector for subsequent exit outside of the HVAC unit;
    and wherein the deflector is configured by folding, bending or molding to comprise at least two discrete contoured faces, one face facing the evaporator and another face facing the heater, with at least one of the contoured faces configured to cause a maximum of air to flow from the cold area towards the distribution area at least in some modes of operation.

7. An air distribution module according to claim 6 wherein the inner wall of the housing in the area of the heated zone or the warm zone comprises a rib.

8. An air distribution module according to claim 7 wherein the inner wall of the housing in the area of the heated zone comprises a rib.

9. An air distribution module according to claim 7, further comprising a locating means.

10. An air distribution module according to claim 6 wherein a wall of the housing in the area of the heated zone and the warm zone comprise a rib.

* * * * *